US009855898B2

United States Patent
Kuhn et al.

(10) Patent No.: US 9,855,898 B2
(45) Date of Patent: Jan. 2, 2018

(54) PLUG-IN SYSTEM FOR HOLDING AT LEAST ONE OBJECT IN THE INTERIOR OF A MOTOR VEHICLE

(71) Applicant: Bayerische Motoren Werke Aktiengesellschaft, Munich (DE)

(72) Inventors: Ralf Kuhn, Unterschleissheim (DE); Eva-Maria Schemm, Munich (DE); Carlos Chibante, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 183 days.

(21) Appl. No.: 14/663,078

(22) Filed: Mar. 19, 2015

(65) Prior Publication Data

US 2015/0191130 A1    Jul. 9, 2015

Related U.S. Application Data

(63) Continuation of application No. PCT/EP2013/068745, filed on Sep. 10, 2013.

(30) Foreign Application Priority Data

Sep. 20, 2012  (DE) .......................... 10 2012 216 915

(51) Int. Cl.
*A47F 5/00* (2006.01)
*B60R 11/00* (2006.01)
*B60N 3/10* (2006.01)

(52) U.S. Cl.
CPC .............. *B60R 11/00* (2013.01); *B60N 3/103* (2013.01); *B60R 2011/0054* (2013.01); *B60R 2011/0061* (2013.01); *B60R 2011/0078* (2013.01)

(58) Field of Classification Search
USPC ....................................... 248/288.51; 224/483
See application file for complete search history.

(56) References Cited

U.S. PATENT DOCUMENTS 2,859,059 A    11/1958   De Loach et al.
4,591,123 A *  5/1986   Bradshaw ................ F16M 7/00
                                                248/179.1

(Continued)

FOREIGN PATENT DOCUMENTS

DE           861 323        12/1952
DE   10 2004 035 871 A1      2/2006
(Continued)

OTHER PUBLICATIONS

International Search Report (PCT/ISA/210) dated Dec. 13, 2013, with English translation (six (6) pages).

(Continued)

*Primary Examiner* — Joanne Silbermann
(74) *Attorney, Agent, or Firm* — Crowell & Moring LLP

(57) ABSTRACT

A plug-in system for holding at least one object in place in the interior of a motor vehicle includes a holding element for holding the object in place and a receiving element for mounting the holding element. The holding element can be connected with the receiving element by way of a releasable connection. In order to make available such a plug-in system, which is not susceptible to damage caused by overload or careless handling, an overload protection system is provided having a spherical element provided on the receiving element, a plate element that interacts with the spherical element, and a receiver for the spherical element of the deflectable receiving element, which receiver is configured on the plate element.

20 Claims, 5 Drawing Sheets

(56) References Cited

U.S. PATENT DOCUMENTS

| | | | |
|---|---|---|---|
| 6,371,345 B1 | 4/2002 | Leyden et al. | |
| 7,753,330 B2 * | 7/2010 | Brief | B60R 11/0241 |
| | | | 248/278.1 |
| 2003/0044227 A1 * | 3/2003 | Parker | F16C 11/0642 |
| | | | 403/135 |

FOREIGN PATENT DOCUMENTS

| | | |
|---|---|---|
| DE | 20 2007 015 191 U1 | 4/2009 |
| DE | 10 2009 054 307 A1 | 5/2011 |
| GB | 2 339 179 A | 1/2000 |

OTHER PUBLICATIONS

German Search Report dated Apr. 23, 2013, with partial English translation (ten (10) pages).

* cited by examiner

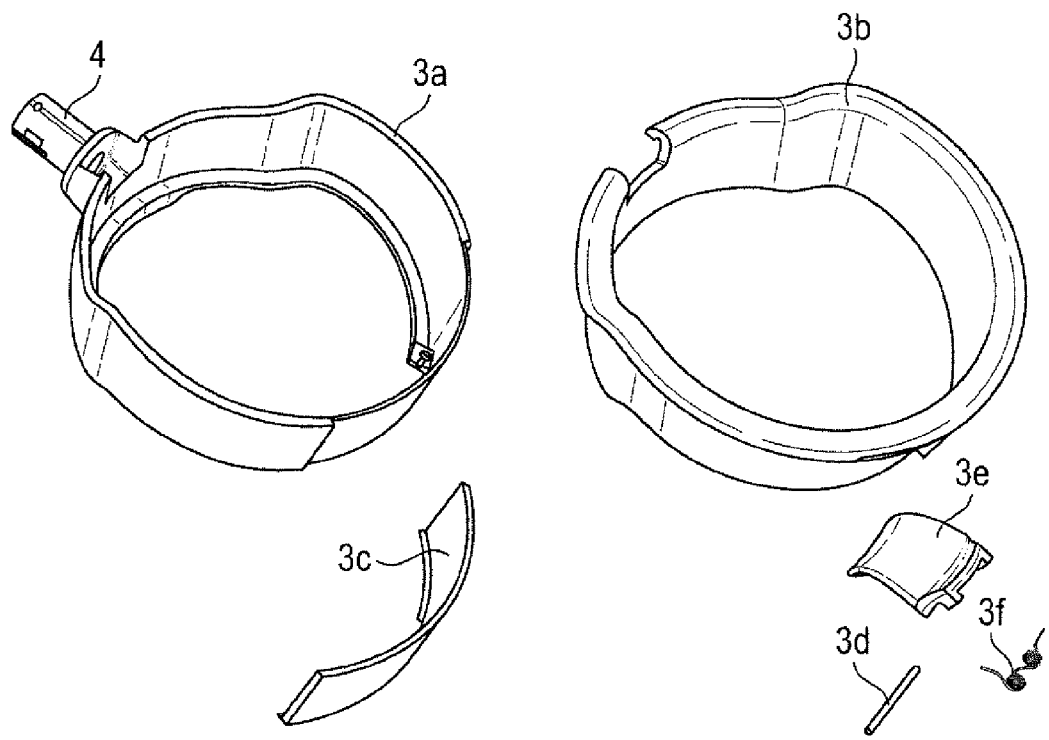
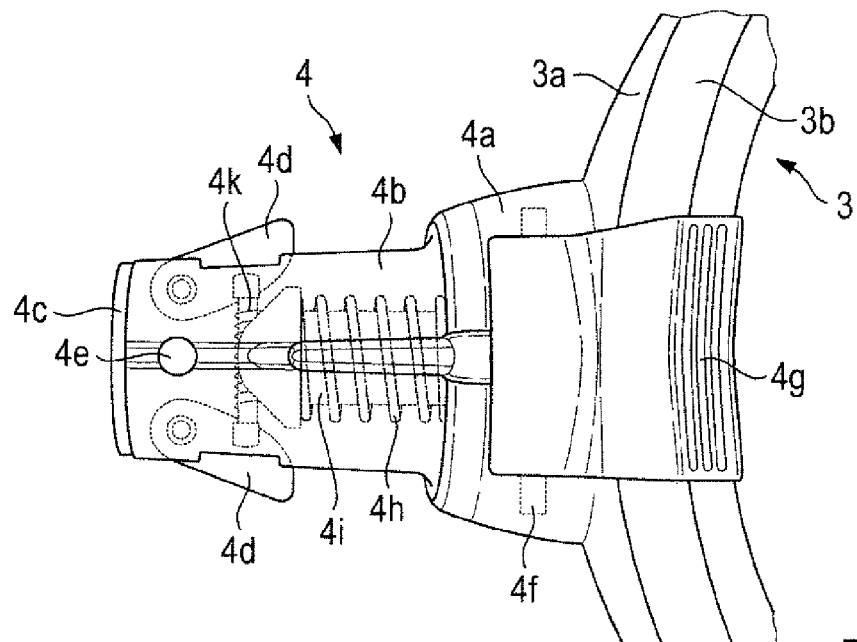
Fig. 3
Fig. 4

PLUG-IN SYSTEM FOR HOLDING AT LEAST ONE OBJECT IN THE INTERIOR OF A MOTOR VEHICLE

CROSS REFERENCE TO RELATED APPLICATIONS

This application is a continuation of PCT International Application No. PCT/EP2013/068745, filed Sep. 10, 2013, which claims priority under 35 U.S.C. §119 from German Patent Application No. 10 2012 216 915.6, filed Sep. 20, 2012, the entire disclosures of which are herein expressly incorporated by reference.

BACKGROUND AND SUMMARY OF THE INVENTION

The present invention relates to a plug-in system for holding at least one object in place in the interior of a motor vehicle. The system includes a holding element for holding the object in place and a receiving element for mounting the holding element, wherein the holding element can be connected with the receiving element by way of a releasable connection.

Such plug-in systems are known. They allow the use of interchangeable inserts, which can be configured, for example, as a cup holder, eyeglass compartment, ashtray, multimedia holder or the like. The known systems are generally fixed in place in the motor vehicle. For this reason they can fail or be damaged in the event of an overload or careless handling.

It is therefore an object of the present invention to make available a plug-in system for holding at least one object in place in the interior of a motor vehicle, which system is not susceptible to damage caused by overload or careless handling.

This and other objects are achieved according to the invention by a plug-in system for holding at least one object in place in the interior of a motor vehicle. The system includes a holding element for holding the object in place and a receiving element for mounting the holding element, wherein the holding element can be connected with the receiving element by way of a releasable connection. An overload protection system is provided, which has a spherical element provided on the receiving element, a plate element that interacts with the spherical element, and a receptacle for the spherical element of the retractable receiving element, which receptacle is configured on the plate element.

As a result of this configuration, a plug-in system is created, which can deflect without failing in the event of an overload or careless handling, and which can subsequently be brought back into its position of use.

According to an advantageous further development, the receiving element essentially has the shape of a hollow, straight circular cone having a ring-shaped bearing body with a spherical mantle surface, disposed on the base surface of the cone. Such a receiving element can be produced easily and in a simple manner, and guarantees the desired functionalities.

According to a preferred embodiment, the hollow, straight circular cone is provided with a rounded-off tip, which forms the spherical element. In this manner, simple production of the spherical element can be implemented.

In order to guarantee precise reciprocal alignment of the individual parts of the overload protection system according to the invention, the receiving element and the plate element are mounted in an essentially tubular housing, according to an advantageous further development.

In this connection, it is advantageous if the bearing body of the receiving element is mounted on the one end of the tubular housing in a deflectable manner such that the spherical element extends into the tubular housing and that the interior of the receiving element is freely accessible from the face side of the housing. This allows easy deflectability of the receiving element, on the one hand, and, on the other hand, simple connection of the receiving element to the holding element.

Preferably, the housing is closed off with a lid at the other end. In this connection, it is advantageous if the lid can be fixed in place on the housing by use of a snap connection. This particularly allows easy and simple mounting of the lid on the housing.

According to a preferred embodiment, the plate element supports itself on the lid by way of an elastic O-ring. In this way, the lid can draw back slightly in the event of an overload, and thereby release the receiving element.

For attaching the plug-in system according to the invention in a motor vehicle, it is provided, according to an advantageous further development, that hooks directed toward the outside are provided on the side of the lid facing away from the housing, which hooks form a torque-proof bayonet connection with related recesses in a functional support that accommodates the housing and is configured in the motor vehicle. As a result, not only can the housing be mounted in the motor vehicle in an easy and simple manner, but it can also be quickly removed again, if necessary.

In order to be able to conveniently connect the holding element with the receiving element or to separate it from the receiving element, the holding element can preferably be connected with the receiving element by way of a releasable snap connection. Furthermore, the holding element has a radially projecting extension, the outer contour of which is adapted to the inner contour of the receiving element.

It is advantageous if the releasable snap connection is formed in that at least one locking tab for engagement of the holding element on the receiving element is provided on the extension.

In order to be able to easily separate the holding element from the receiving element, the locking tab can be brought into a release position by way of a manually activated button, in which position the holding element can be taken off the receiving element, according to a preferred embodiment.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is an exploded representation of the holding element;

FIG. 4 is a detail view of the holding element in the region of the extension;

DETAILED DESCRIPTION OF THE DRAWINGS

Only the plug-in system according to an embodiment of the invention is shown in the figures. All of the parts of a motor vehicle in which the plug-in system can be used have been left out for the sake of clarity.

The plug-in system essentially consists of a holding element 1 and a receiving element 2.

The holding element 1 can be configured, for example, as a cup holder, eyeglass compartment, ashtray, media holder or the like. Because it is configured as a cup holder or bottle holder in the present example, the holding element 1 has an essentially ring-shaped plug-in ring 3.

The plug-in ring 3 consists of a lower plug-in ring part 3*a* and an upper plug-in ring part 3*b* (see FIG. 3). In the assembled state, the upper plug-in ring 3*b* forms the inner wall of the plug-in ring 3, and the lower plug-in ring 3*a* forms its outer wall. An insert 3*c* composed of a soft component, such as, for example, a thermoplastic elastomer, is provided on the lower plug-in ring part 3*a*, which insert is inserted into a recess on the outside of the lower plug-in ring part 3*a*.

Furthermore, a tab 3*e* that can pivot about an axle 3*d* is provided on the plug-in ring 3. The tab is pressed into the interior of the plug-in ring 3 by a spring 3*f* in order to secure a bottle or the like that is accommodated in the plug-in ring 3.

The lower plug-in ring part 3*a*, the upper plug-in ring part 3*b*, and the tab 3*e* can be made of ABS.

An extension 4 that projects radially outward from the lower plug-in ring part 3*a* is formed on the lower plug-in ring part 3*a*, on the side that lies opposite to the insert 3*c*. The extension 4 serves for releasably connecting the holding element 1 with the receiving element 2.

The extension 4 has a slightly narrowing first section 4*a* formed onto the lower plug-in ring part 3*a*, and a second section 4*b* formed onto the first section 4*a* (see FIG. 4). The second section 4*b* is closed off, at its end facing away from the plug-in ring 3, with a plate 4*c* that carries two pivotable locking tabs 4*d*. The locking tabs 4*d* project beyond the outer contour of the second section 4*b* on opposite sides, in the normal state, as shown in FIG. 4. The plate 4*c* with the locking tabs 4*d* is inserted into the second section 4*b* on the face side, and is held by a fastening pin 4*e* that passes radially through the second section 4*b* of the extension 4.

Figure 8:
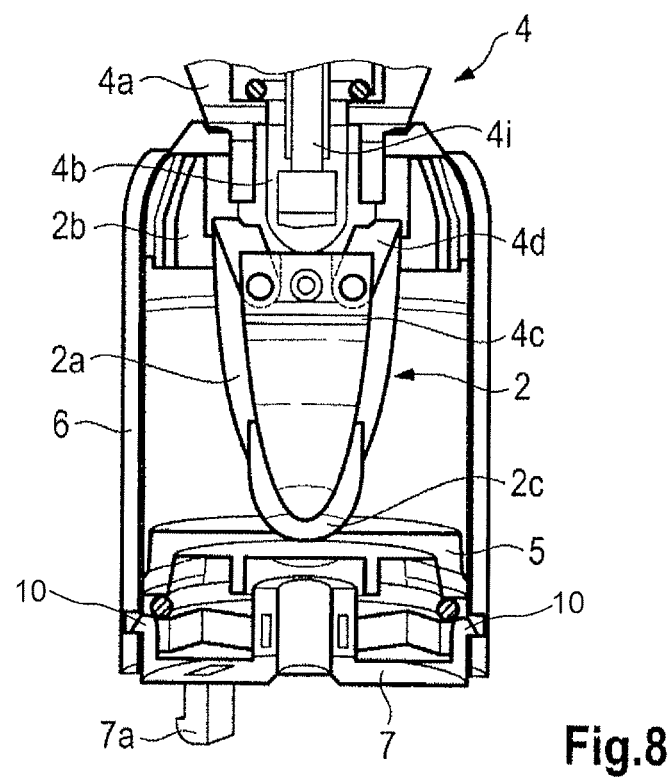
FIG. 8 is a section view through the overload safeguard.

When the extension 4, the outer contour of which is adapted to the inner contour of the receiving element 2, is inserted into the receiving element 2 in this state, the locking tabs 4*d* engage into corresponding undercuts of the receiving element 2 and hold the holding element 1 in place on the receiving element 2 (see FIG. 8).

In order to release the holding element 1 from the receiving element 2, a button 4*g* that can be pivoted about an axle 4*f* is mounted on the first section 4*a* of the extension 4. This button 4*g* stands in active engagement with a release rod 4*i* surrounded by a pressure spring 4*h*, in such a manner that when pressure is exerted on the button 4*g*, the release rod 4*i* is pulled in the direction toward the plug-in ring 3, counter to the effect of the pressure spring 4*h* (to the right in FIG. 4). In this state, the front end of the release rod 4*i* no longer forces the locking tabs 4*d* outward, so that they are pulled inward by a tension spring 4*k* that connects the locking tabs 4*d*, and come out of engagement with the undercuts of the receiving element 2. In this state, the holding element 1 can be removed from the receiving element 2.

Advantageously, the locking pin 4*e* and the release rod 4*i* can be produced from polyoxymethylene (POM), the plate 4*c* can be produced from a glass-fiber-reinforced polyamide 6 (PA 6 GF), and the button 4*g* can be produced from a polymer mixture such as acryl nitrile/butadiene/styrene and polycarbonate (ABS-PC).

Figure 1:
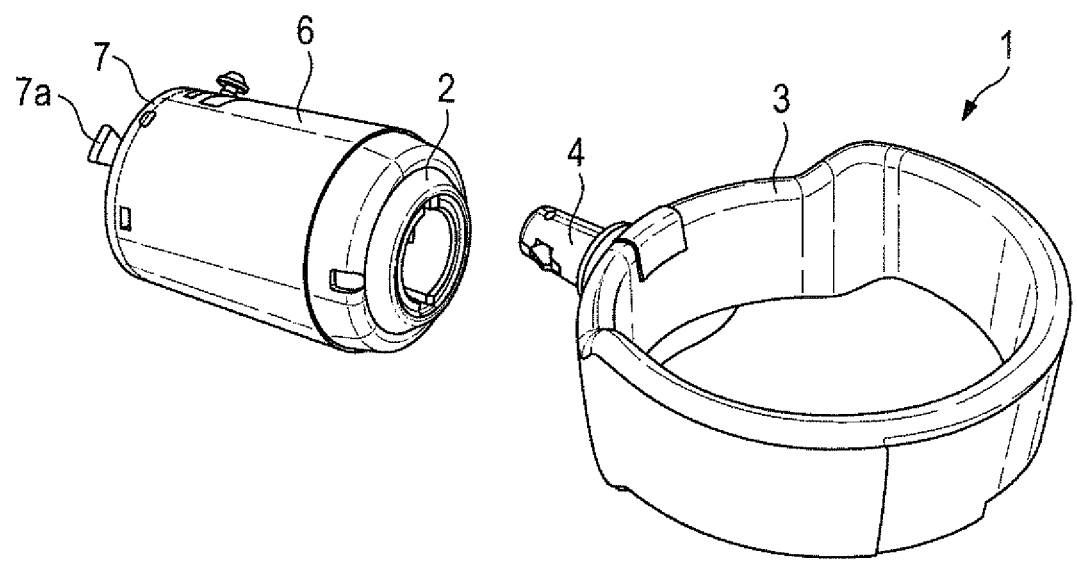
FIG. 1 is a perspective view of a plug-in system according to an embodiment of the invention.
Figure 2:
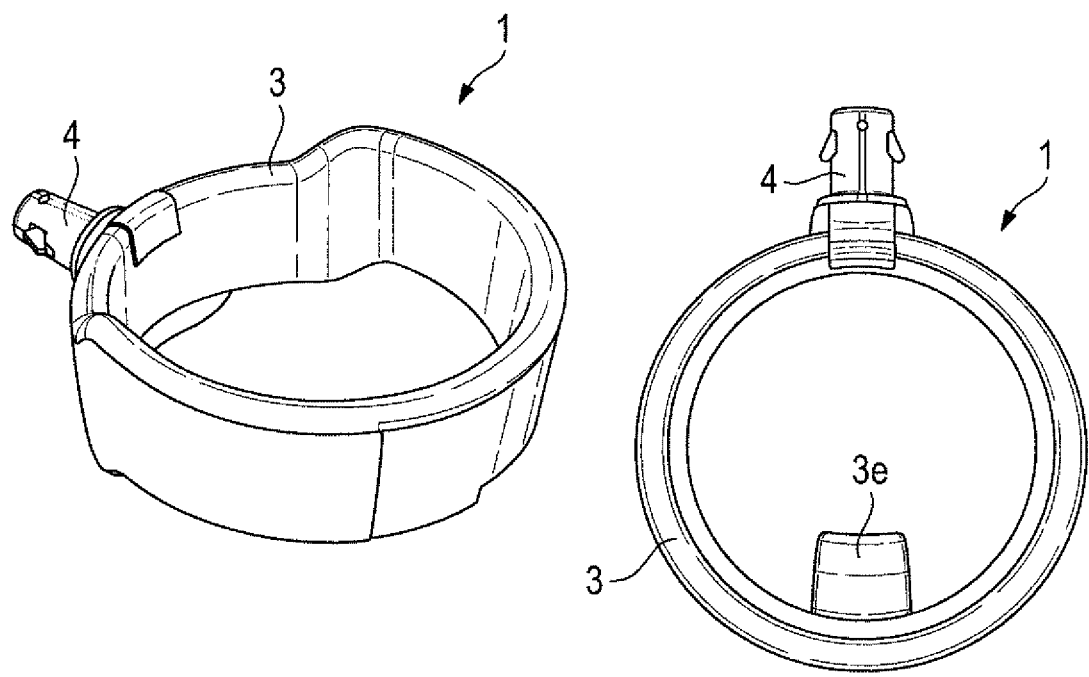
FIG. 2 is a perspective view of the holding element.
Figure 5:
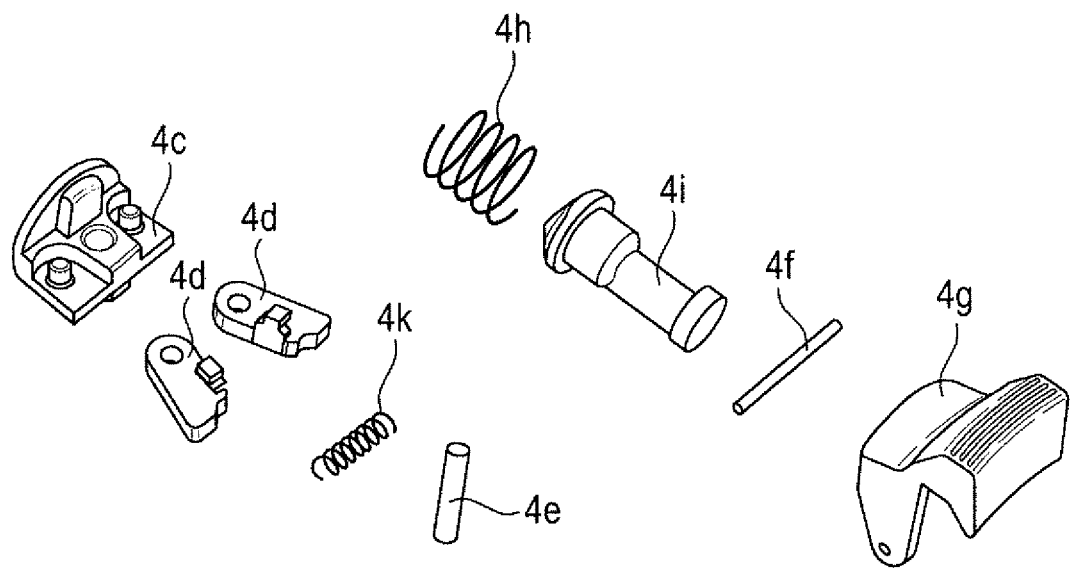
FIG. 5 is an exploded representation of the locking elements disposed in the extension.
Figure 6:
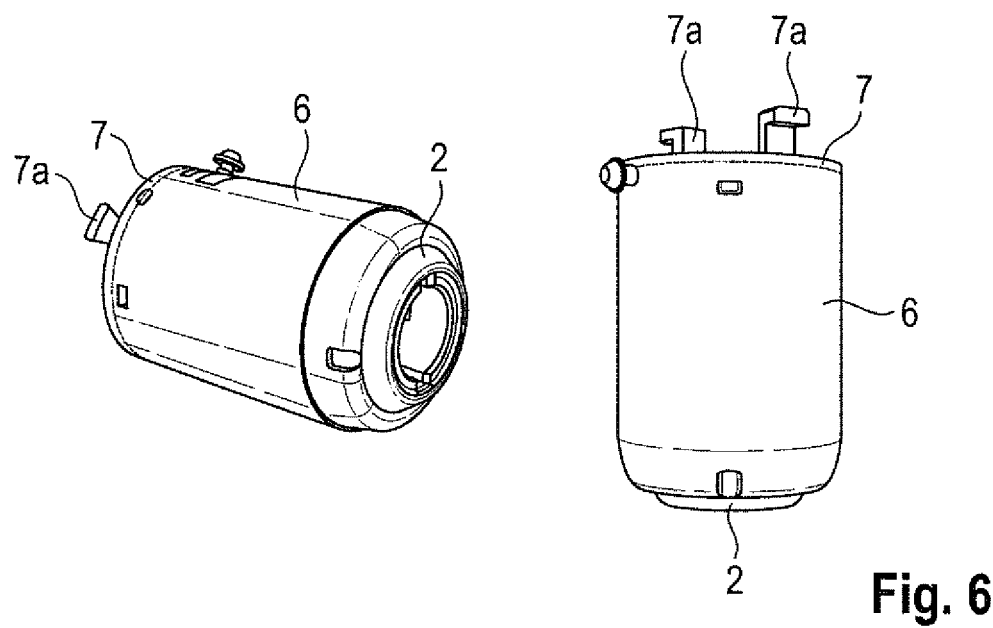
FIG. 6 is a perspective view of the receiving element.
Figure 7:
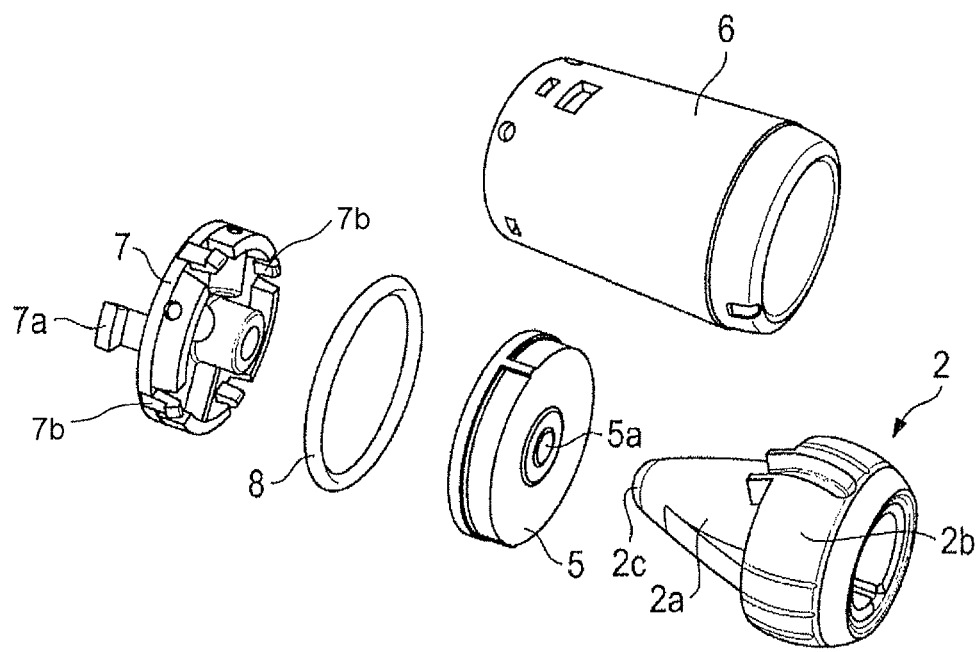
FIG. 7 is an exploded representation of the overload safeguard according to an embodiment of the invention.

The receiving element 2 is essentially formed by a hollow, straight circular cone 2*a* and a ring-shaped bearing body 2*b* having a spherical mantle surface, disposed on the base surface of the cone (see FIG. 7). The tip of the circular cone 2*b* is rounded off and forms a spherical element 2*c*, which interacts with a receiver 5*a* disposed in the center of a circular, planar plate element 5, for example in the form of a depression.

The receiving element 2 and the plate element 5 are mounted in an essentially tubular housing 6. In this connection, the receiving element 2 is disposed on the one end of the tubular housing 6 in a deflectable manner such that the spherical element 2*c* extends into the tubular housing 6. The interior of the receiving element 2 is freely accessible from the face side of the housing 6 so that the extension 4 of the holding element 1 can be inserted into the receiving element 2. The spherical mantle surface of the bearing body 2*b* allows pivotable mounting of the receiving element 2 in the housing 6. The other end of the housing 6 is closed off by a lid 7 that can be fixed in place on the housing 6 by way of a snap connection 10 using lid snap tabs 7*b* (see FIGS. 7-8). The plate element 5 supports itself on the lid 7 by way of an elastic O-ring 8, which can consist of ethylene/propylene/diene rubber (EPDM) 60°, for example.

Figure 9:
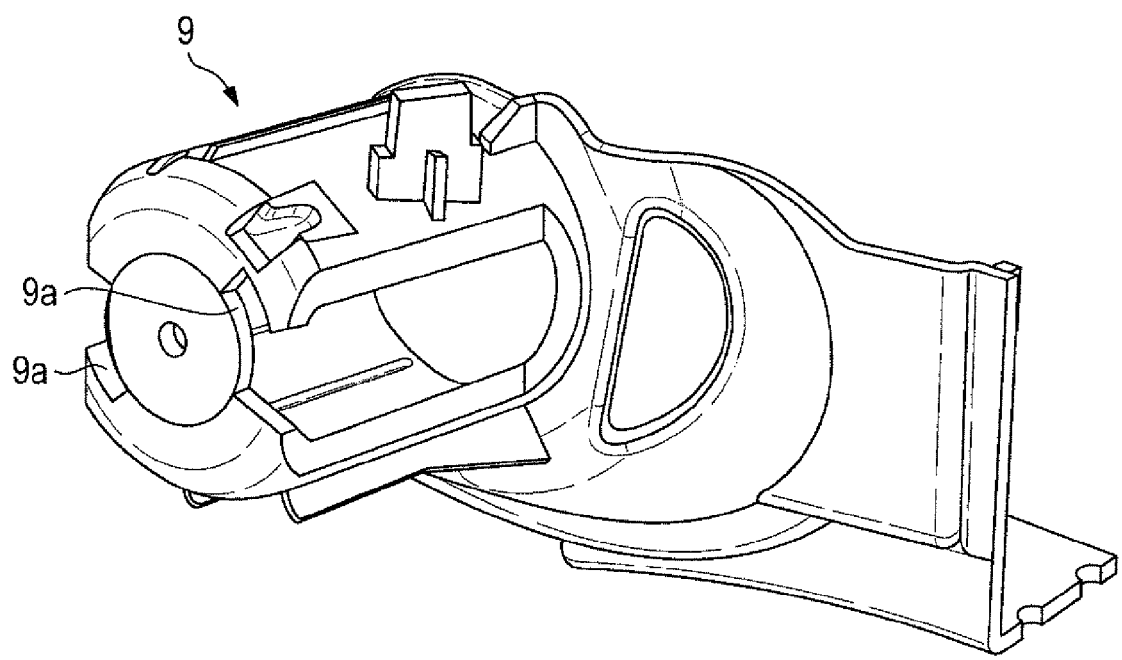
FIG. 9 is a perspective view of a functional support that accommodates a plug-in system according to an embodiment of the invention.

On the side of the lid 7 that faces away from the housing 6, hooks 7*a* directed outward are provided. The hooks 7*a* form a torque-proof bayonet connection with related recesses 9*a* in a functional support 9 that accommodates the housing 6 and is configured in the motor vehicle (see FIG. 9).

Advantageously, the receiving element 2 and the plate element 5 can be produced from polyoxymethylene (POM), and the housing 6 as well as the lid 7 can be produced from a polymer mixture such as acryl nitrile/butadiene/styrene and polycarbonate (ABS-PC).

In the normal state, when the holding element 1 is inserted into the receiving element 2, the spherical element 2*c* is situated in the receiver 5*a* of the plate element 5. If an overload of 150 N, for example, now acts on the holding element 1, the bearing body 2*b* of the receiving element 2 attempts to pivot in the housing 6. As a result of this pivoting movement, the ball element 2*c* presses the plate element 5 against the elastic O-ring 8 and pushes it in the direction toward the lid 7. Now the receiver 5*a* releases the ball element 2*c* and the holding element 1 can perform a pivoting movement, without the possibility of damage or actual destruction of the plug-in system occurring. Subsequently, the holding element 1 can be set back into its position of use, by hand, with the ball element 2*c* resuming its position in the receiver 5*a* of the plate element 5.

REFERENCE SYMBOL LIST

1 holding element
2 receiving element
2*a* circular cone
2*b* bearing body 2c spherical element
3 plug-in ring
3a lower plug-in ring part
3b upper plug-in ring part
3c insert
3d axle
3e tab
3f spring
4 extension
4a first section
4b second section
4c plate
4d locking tabs
4e fastening pin
4f axle
4g button
4h pressure spring
4i release rod
4k tension spring
5 plate element
5a receiver
6 housing
7 lid
7a hook
7b lid snap tabs
8 O-ring
9 functional support
9a recesses
10 snap connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A plug-in system for holding an object in an interior of a motor vehicle, comprising:
   a holding element configured to hold the object in place;
   a receiving element comprising a spherical element and configured to mount the holding element, the holding element being connectable with the receiving element via a releasable connection, the spherical element forming one end of the receiving element; and
   an overload protection system comprising the spherical element provided on the receiving element, a plate element configured to interact with the spherical element, and a receiver configured on the plate element and adapted to receive the spherical element of the receiving element so as to be deflectable out of the receiver.

2. The plug-in system according to claim 1, wherein the receiving element comprises:
   a straight circular hollow cone;
   a ring-shaped bearing body having a spherical mantle surface; and
   wherein the ring-shaped bearing body is disposed on a base surface of the cone.

3. The plug-in system according to claim 2, wherein the cone has a rounded-off tip forming the spherical element.

4. The plug-in system according to claim 3, wherein the receiving element and the plate element are mounted in a tubular housing.

5. The plug-in system according to claim 4, further comprising a lid configured to close-off one end of the tubular housing.

6. The plug-in system according to claim 5, wherein the lid is fixable in place on the housing via a snap connection.

7. The plug-in system according to claim 4, wherein
   the bearing body of the receiving element is mounted on one end of the tubular housing in a deflectable manner with the spherical element extending into the tubular housing, and
   an interior of the receiving element is freely accessible from a face side of the tubular housing.

8. The plug-in system according to claim 7, further comprising a lid configured to close-off the tubular housing at the other end.

9. The plug-in system according to claim 8, wherein the plate element is supported on the lid via an elastic O-ring.

10. The plug-in system according to claim 8, wherein hooks directed outwardly are provided on a side of the lid facing away from the housing, the hooks forming a torque-proof bayonet connection with corresponding recesses in a functional support configured to accommodate the housing.

11. The plug-in system according to claim 8, wherein the lid is fixable in place on the housing via a snap connection.

12. The plug-in system according to claim 11, wherein the plate element is supported on the lid via an elastic O-ring.

13. The plug-in system according to claim 1, wherein the receiving element and the plate element are mounted in a tubular housing.

14. The plug-in system according to claim 13, wherein
   a bearing body of the receiving element is mounted on one end of the tubular housing in a deflectable manner with the spherical element extending into the tubular housing, and
   an interior of the receiving element is freely accessible from a face side of the tubular housing.

15. The plug-in system according to claim 1, wherein the holding element is connectable with the receiving element via a releasable snap connection.

16. The plug-in system according to claim 1, wherein the holding element has a radially projecting extension, an outer contour of the extension being adapted to an inner contour of the receiving element.

17. The plug-in system according to claim 16, wherein at least one locking tab is provided on the extension, the locking tab being configured to engage the holding element on the receiving element.

18. The plug-in system according to claim 17, further comprising a manually activatable button configured to displace the locking tab into a release position in which the holding element is removable from the receiving element.

19. The plug-in system according to claim 1, wherein the receiver is the only receiver configured on the plate element.

20. The plug-in system according to claim 1, wherein the plate element is detachable from the receiving element.

* * * * *